US010969271B2

(12) United States Patent
Lin

(10) Patent No.: US 10,969,271 B2
(45) Date of Patent: Apr. 6, 2021

(54) DEVICE AND METHOD FOR DETECTING AND CALIBRATING ILLUMINANCE

(71) Applicant: Quanta Computer Inc., Taoyuan (TW)

(72) Inventor: Hsin-Liang Lin, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 120 days.

(21) Appl. No.: 16/255,935

(22) Filed: Jan. 24, 2019

(65) Prior Publication Data

US 2020/0088569 A1 Mar. 19, 2020

(30) Foreign Application Priority Data

Sep. 18, 2018 (TW) .................................. 107132787

(51) Int. Cl.
*G01J 1/02* (2006.01)
*G01J 1/08* (2006.01)
*G01J 1/04* (2006.01)

(52) U.S. Cl.
CPC ........... *G01J 1/0295* (2013.01); *G01J 1/0418* (2013.01); *G01J 1/08* (2013.01)

(58) Field of Classification Search
CPC .......... G01J 1/0295; G01J 1/08; G01J 1/0418; G01J 1/0228; G01J 2001/4252; G01J 3/513; G01J 1/0492; G01J 1/0204; G01J 3/505; G01J 1/4228; G01J 2001/1678; G01J 1/42
See application file for complete search history.

(56) References Cited

U.S. PATENT DOCUMENTS

| 4,378,490 A | * | 3/1983 | d'Auria Luigi ....... G02F 1/0121 250/201.1 |
| 2003/0146663 A1 | * | 8/2003 | Nelson ..................... G01J 1/08 307/11 |
| 2005/0040314 A1 | * | 2/2005 | Kuo ......................... G01J 1/42 250/205 |
| 2009/0066938 A1 | * | 3/2009 | Liu ....................... G01J 1/0422 356/226 |

FOREIGN PATENT DOCUMENTS

EP  0160205 A1 * 11/1985 ............... G01J 1/24
TW  I408345 B      9/2013

OTHER PUBLICATIONS

Chinese language office action dated Apr. 3, 2019, issued in application No. TW 107132787.

* cited by examiner

*Primary Examiner* — Jennifer D Bennett
(74) *Attorney, Agent, or Firm* — McClure, Qualey & Rodack, LLP

(57) ABSTRACT

An illuminance calibrating device includes a reference light source and an illuminance detection device. The reference light source, which generates light with a specific wavelength and a source illuminance, adjusts the source illuminance to be a first illuminance according to a control signal. The illuminance detection device includes a shading plate, an illuminance detector, and a controller. The shading plate is configured to lower the first illuminance to a first shading illuminance. The illuminance detector detects the first shading illuminance to generate a detection signal. The controller generates the control signal and calculates a ratio of the first illuminance to the first shading illuminance according to the detection signal.

10 Claims, 8 Drawing Sheets

DEVICE AND METHOD FOR DETECTING AND CALIBRATING ILLUMINANCE

CROSS REFERENCE TO RELATED APPLICATIONS

This Application claims priority of Taiwan Patent Application No. 107132787, filed on Sep. 18, 2018, the entirety of which is incorporated by reference herein.

BACKGROUND OF THE INVENTION

Field of the Invention

The disclosure relates generally to methods and devices for detecting illuminance, and more particularly it relates to methods and devices for calibrating and detecting illuminance.

Description of the Related Art

Each mobile device produced recently carries a light sensor, and a shading plate is always adopted to filter out some light. Therefore, the difference of illuminance detected by light sensors integrated into different mobile devices is very large. In addition, the differences among light sensors and the difference in light transmittance among different shading plates may lead to significant differences in the illuminance detected by different mobile devices.

Therefore, devices and methods for calibrating and detecting illuminance may be required for the consistency of illuminance detected by different mobile devices.

BRIEF SUMMARY OF THE INVENTION

In an embodiment, an illuminance calibrating device comprises a reference light source and an illuminance detecting device. The reference light source generates light of a specified wavelength and a source illuminance. The reference light source adjusts the source illuminance to be a first illuminance according to a control signal.

The illuminance detecting device comprises a shading plate, an illuminance detector, and a controller. The shading plate is configured to lower the first illuminance to a first shading illuminance. The illuminance detector detects the first shading illuminance to generate a detection signal. The controller generates the control signal and calculating a first ratio of the first illuminance to the first shading illuminance according to the detection signal.

According to an embodiment of the invention, when the illuminance detecting device is configured to detect illuminance generated by a source-under-test, the illuminance detector determines, through the shading plate, that illuminance of the specified wavelength is equal to a detected illuminance and generates the detection signal. The controller determines that the illuminance generated by the source-under-test is a product of the detected illuminance and the first ratio according to the detection signal. The detected illuminance is less than the first shading illuminance.

According to another embodiment of the invention, the controller further adjusts the source illuminance to be a second illuminance according to the control signal, the shading plate lowers the second illuminance to be a second shading illuminance, the illuminance detector determines the second shading illuminance to generate the detection signal, and the controller calculates a second ratio of a first difference to a second difference according to the detection signal.

According to an embodiment of the invention, the first difference is the second illuminance minus the first illuminance, and the second difference is the second shading illuminance minus the first shading illuminance, wherein the second illuminance exceeds the first illuminance and the second shading illuminance exceeds the first shading illuminance.

According to an embodiment of the invention, when the illuminance detector is configured to determine illuminance of a source-under-test, the illuminance detector determines, through the shading plate, that illuminance of the specified wavelength is equal to a detected illuminance and generates the detection signal, and the controller further determines whether the detected illuminance exceeds the first shading illuminance and/or the second shading illuminance.

According to an embodiment of the invention, when the detected illuminance exceeds the first shading illuminance and is less than the second shading illuminance, the controller determines that the illuminance of the source-under-test is a product of the detected illuminance and the second ratio.

According to an embodiment of the invention, the specified wavelength is from 390 nm to 700 nm.

In an embodiment, an illuminance calibrating method comprises: generating light of a specified wavelength and a source illuminance by using a reference light source; adjusting the source illuminance to be a first illuminance; lowering the first illuminance to be a first shading illuminance by using a shading plate; determining the first shading illuminance; and calculating a first ratio of the first illuminance to the first shading illuminance.

According to an embodiment of the invention, the illuminance calibrating device further comprises: adjusting the source illuminance to be a second illuminance, wherein the second illuminance exceeds the first illuminance; lowering the second illuminance to be a second shading illuminance by using the shading plate; determining the second shading illuminance; and calculating a second ratio of a first difference to a second difference, wherein the first difference is the second illuminance minus the first illuminance, and the second difference is the second shading illuminance minus the first shading illuminance.

According to an embodiment of the invention, the specified wavelength is from 390 nm to 700 nm.

In an embodiment, an illuminance detecting method comprises: determining that illuminance of a specified wavelength generated by a source-under-test is a detected illuminance by using a shading plate; determining whether the detected illuminance is less than the first shading illuminance; and when the detected illuminance is less than the first shading illuminance, determining that the illuminance of the source-under-test is a product of the detected illuminance and a first ratio, wherein the first ratio corresponds to the first shading illuminance.

According to an embodiment of the invention, the illuminance detecting method further comprises: determining whether the detected illuminance is less than the first shading illuminance and/or the second shading illuminance; when the detected illuminance is not less than the first shading illuminance and is less than the second shading illuminance, determining that the illuminance of the source-under-test is a product of the detected illuminance and a second ratio, wherein the second shading illuminance exceeds the first shading illuminance, and the second ratio corresponds to the second shading illuminance; and when the detected illuminance is not less than the second shading illuminance, generating an alarm.

According to an embodiment of the invention, the specified wavelength is from 390 nm to 700 nm.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
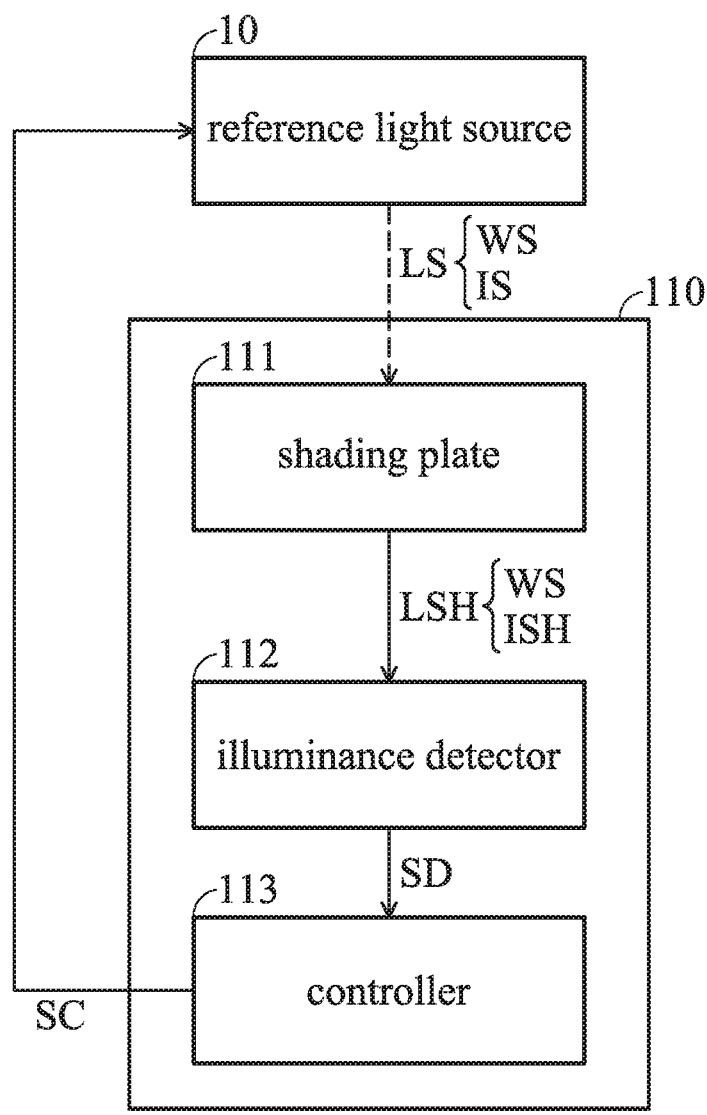
FIG. 1 is a block diagram of an illuminance calibrating device in accordance with an embodiment of the invention.

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It should be understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

FIG. 1 is a block diagram of an illuminance calibrating device in accordance with an embodiment of the invention. As shown in FIG. 1, the illuminance calibrating device 100 includes a reference light source 10 and an illuminance detecting device 110. The reference light source 10 generates light LS of a specified wavelength WS and a source illuminance IS, and adjusts the source illuminance according to a control signal SC.

According to an embodiment of the invention, for the sake of unifying the illuminance detected by the illuminance detecting device 110 and the illuminance seen by the human eye, the specified wavelength WS should be in the range of visible light. Therefore, the specified wavelength WS should be from 390 nm to 700 nm. According to another embodiment of the invention, since the human eye is most sensitive to light of 550 nm wavelength, the specified wavelength WS may be light of 550 nm wavelength.

The illuminance detecting device 110 includes a shading plate 111, an illuminance detector 112, and a controller 113. The shading plate 111 has a light transmittance. When the light LS with the source illuminance IS passes through the shading plate 111, a shading light LSH with a shading illuminance ISH is generated, in which the shading illuminance ISH is less than the source illuminance IS.

According to an embodiment of the invention, the shading illuminance ISH is a product of the source illuminance IS and the light transmittance of the shading plate 111. For example, when the light transmittance is 5%, the shading illuminance ISH is 5% of the source illuminance IS. According to an embodiment of the invention, the shading plate 111 is merely configured to lower the source illuminance IS of the light LS, but not to filter out some wavelength of the light LS.

The illuminance detector 112 is configured to detect the source illuminance IS of the light LS through the shading plate 111. That is, the illuminance detector 112 detects the shading illuminance ISH to generate a detection signal SD. According to an embodiment of the invention, since the illuminance level that the illuminance detector 112 is capable to detect is limited, the shading plate 111 is required to lower the source illuminance IS generated by the reference light source 10 for improving the range that the illuminance detector 112 is capable to detect.

The controller 113 adjusts the source illuminance IS of the light LS generated by the reference light source 10 by using the control signal SC, and receives the shading illuminance ISH detected by the illuminance detector 112 by the detection signal SD to calculate a ratio of the source illuminance IS and the shading illuminance ISH. In addition, the controller 113 also stores the ratio.

Figure 2:
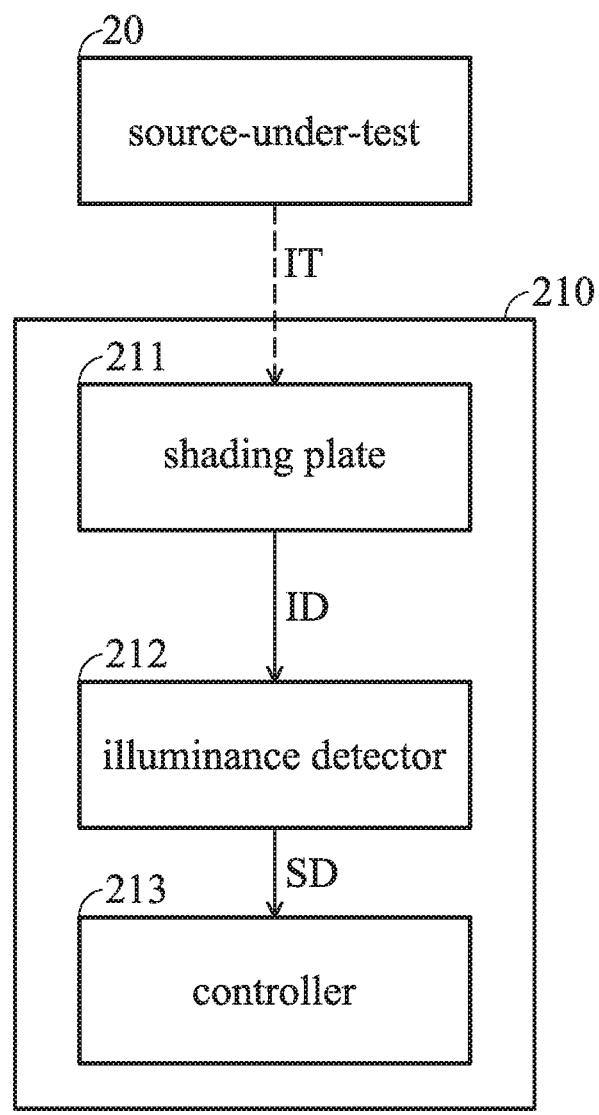
FIG. 2 is a block diagram of an illuminance detecting device in accordance with an embodiment of the invention.

FIG. 2 is a block diagram of an illuminance detecting device in accordance with an embodiment of the invention. As shown in FIG. 2, the illuminance detecting device 200 is configured to detect an illuminance-under-test IT generated by a source-under-test 20. The illuminance detecting device 200 includes a shading plate 211, an illuminance detector 212, and a controller 213, in which the illuminance detecting device 200 corresponds to the illuminance detecting device 110 in FIG. 1, and the shading plate 211, the illuminance detector 212, and the controller 213 correspond to the shading plate 111, the illuminance detector 112, and the controller 113 in FIG. 1 respectively.

The shading plate 211 is configured to lower the illuminance-under-test IT generated by the source-under-test 20. When the detected illuminance ID of the specified wavelength WS is determined by the illuminance detector 212 through the shading plate 211, the illuminance detector 212 generates a detection signal SD. The controller 213 receives the detected illuminance ID according to the detection signal SD and calculates that the illuminance-under-test IT is the product of the detected illuminance ID and the ratio.

According to an embodiment of the invention, the detected illuminance ID is less than the shading illuminance ISH. According to an embodiment of the invention, when the source-under-test 20 is the sun light, the light generated by the source-under-test 20 is full spectrum. The illuminance detector 212 determines, through the shading plate 211, that the illuminance of the specific wavelength WS is the detected illuminance ID.

Figure 3:
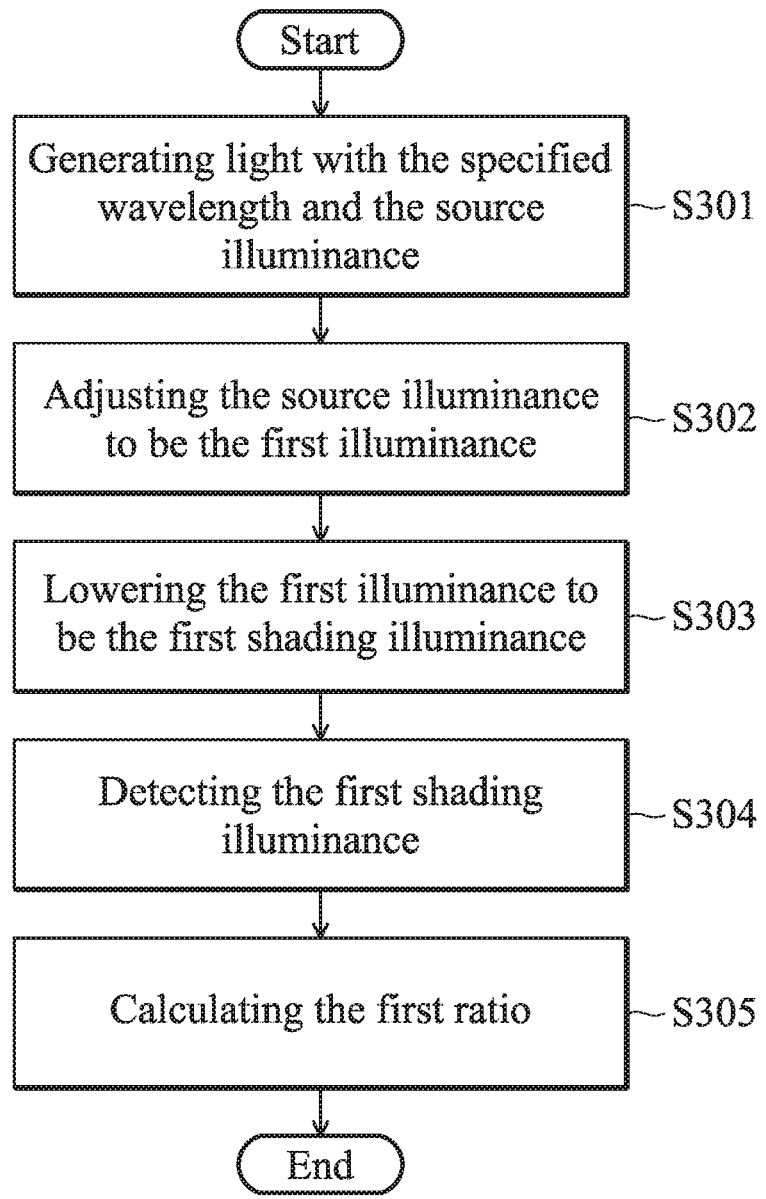
FIG. 3 is a flow chart of an illuminance calibrating method in accordance with an embodiment of the invention.

FIG. 3 is a flow chart of an illuminance calibrating method in accordance with an embodiment of the invention. The following description to the illuminance calibrating method 300 will be described with FIG. 1 for simplicity of explanation.

The reference light source 10 in FIG. 1 generates light LS with the specified wavelength WS and the source illuminance IS (Step S301). According to an embodiment of the invention, the specified wavelength WS is in the range of visible light. Therefore, the specified wavelength WS is from 390 nm to 700 nm, or from 380 nm to 780 nm. According to another embodiment of the invention, since the human eye is the most sensitive to 550 nm of light, the specified wavelength WS may be 550 nm.

The controller 113 adjusts the source illuminance IS to be the first illuminance IS1 by the control signal SC (Step S302). According to an embodiment of the invention, the reference light source 10 merely generates light LS with the specified wavelength WS. That is, the light LS with the specified wavelength WS generated by the reference light source 10 is the first illuminance IS1. Then, the shading plate 111 lowers the first illuminance IS1 to be the first shading illuminance ISH1 (Step S303).

The illuminance detector 112 further detects the first shading illuminance ISH1 (Step S304), and transmits the detected first shading illuminance ISH1 to the controller 113. The controller 113 calculates the first ratio R1 of the first illuminance IS1 to the first shading illuminance ISH1 (Step S305), and stores the first ratio R1.

Figure 4:
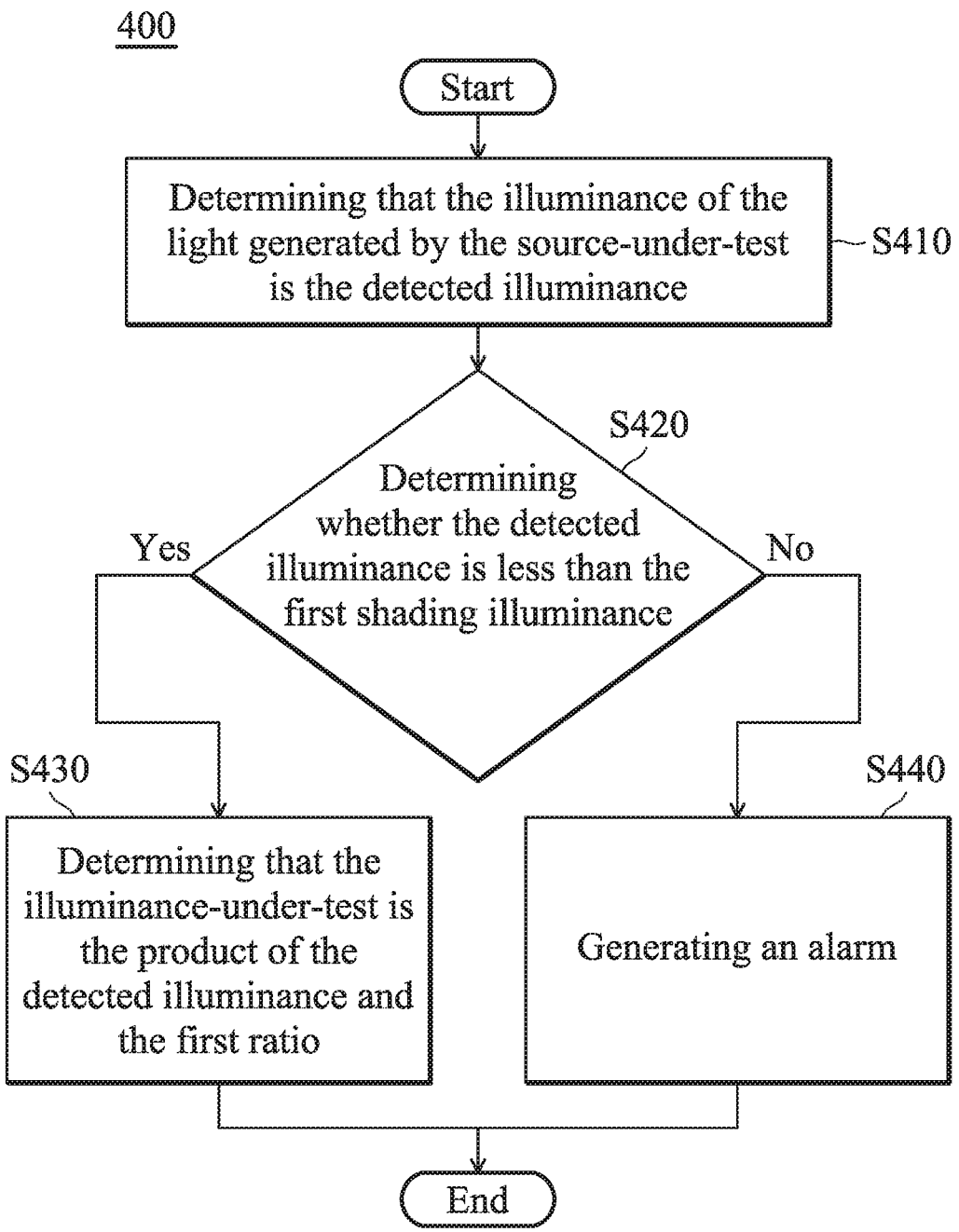
FIG. 4 is a flow chart of an illuminance detecting method in accordance with an embodiment of the invention.

FIG. 4 is a flow chart of an illuminance detecting method in accordance with an embodiment of the invention. The following description to the illuminance detecting method 400 will be described with FIG. 2 for simplicity of explanation.

The illuminance detector 212, through the shading plate 211, determines that the illuminance of the light with the specified wavelength generated by the source-under-test 20 is the detected illuminance ID (Step S410). The controller 213 determines whether the detected illuminance ID is less than the first shading illuminance ISH1 (Step S420).

When the detected ID is less than the first shading illuminance ISH1, the controller 213 determines that the illuminance-under-test IT in FIG. 2 is the product of the detected illuminance ID and the first ratio R1 (Step S430). When the detected illuminance ID is not less than the first shading illuminance ISH1, the controller 213 generates an alarm (Step S440) to inform the user that the illuminance-under-test IT exceeds the detectable range.

Figure 5:
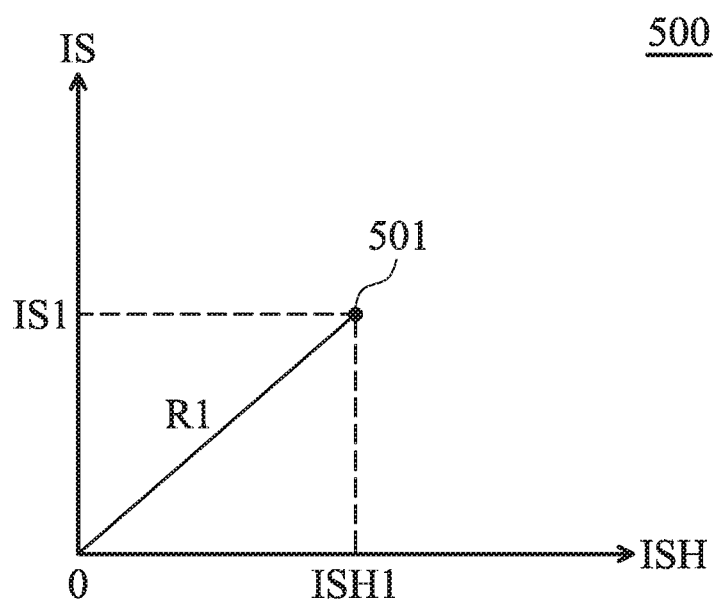
FIG. 5 illustrates the relationship between a source illuminance and a shading illuminance in accordance with an embodiment of the invention.

FIG. 5 illustrates the relationship between a source illuminance and a shading illuminance in accordance with an embodiment of the invention. As shown in FIG. 5, the Y-axis of the graph 500 is the source illuminance IS, and the X-axis is the shading illuminance ISH. The data point 501 indicates that the shading illuminance ISH through the shading plate 111 is the first shading illuminance ISH1 when the source illuminance IS is the first illuminance IS1. The first ratio R1 is the slope of the line formed by the data point 501 and the origin point O.

According to an embodiment of the invention, when the detected ID is less than the first shading illuminance ISH1, the controller 213 could determines the illuminance-under-test IT by the first ratio R1 and the detected illuminance ID. According to another embodiment of the invention, when the detected illuminance ID is not less than the first shading illuminance ISH1, the controller 213 may not determine the illuminance-under-test IT. Therefore, an alarm is generated to inform the user that the illuminance-under-test IT exceeds the detectable range. According to an embodiment of the invention, the first illuminance IS1 may be raised to improve the detectable range of the illuminance detecting device 200.

Figure 6:
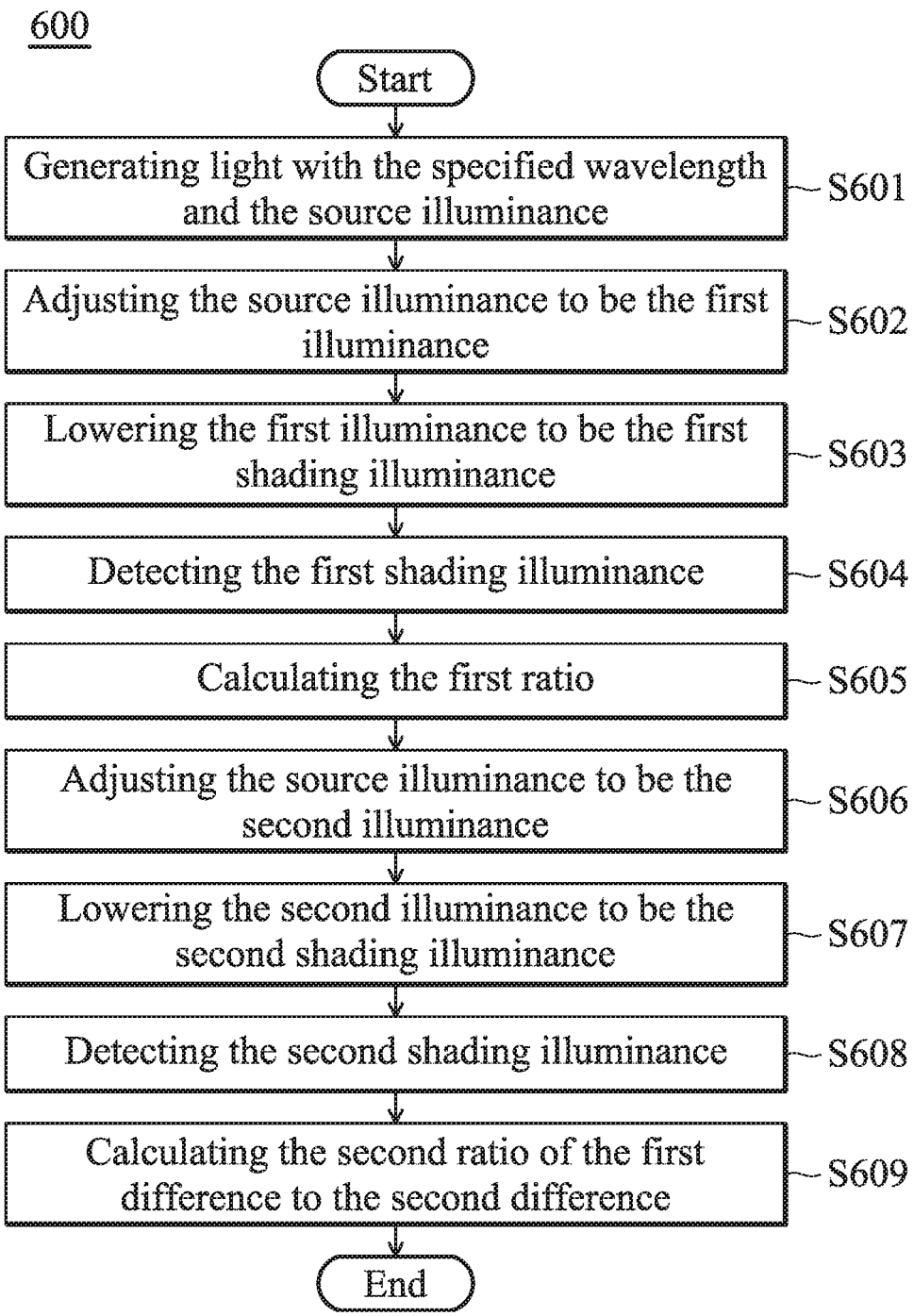
FIG. 6 is a flow chart of an illuminance calibrating method in accordance with another embodiment of the invention.

FIG. 6 is a flow chart of an illuminance calibrating method in accordance with another embodiment of the invention. The following description to the illuminance calibrating method 600 will be described with FIG. 1 for simplicity of explanation.

As shown in FIG. 6, Step S601 to Step S605 are identical to Step S301 to Step S305 in FIG. 3, which are not repeated herein. The controller 113 in FIG. 1 further adjusts, by the control signal SC, the source illuminance IS to be the second illuminance IS2 (Step S606), in which the second illuminance IS2 exceeds the first illuminance IS1.

The shading plate 111 in FIG. 1 lowers the second illuminance IS2 to be the second shading illuminance ISH2 (Step S607). The illuminance detector 112 detects the second shading illuminance ISH2 (Step S608) and transmits the detected second shading illuminance ISH2 to the controller 113. The controller 113 calculates the second ratio of the first difference to the second difference (Step S609), and stores the second ratio R2, in which the first difference is the second illuminance IS2 minus the first illuminance IS1, and the second difference is the second shading illuminance ISH2 minus the first shading illuminance ISH1.

Figure 7:
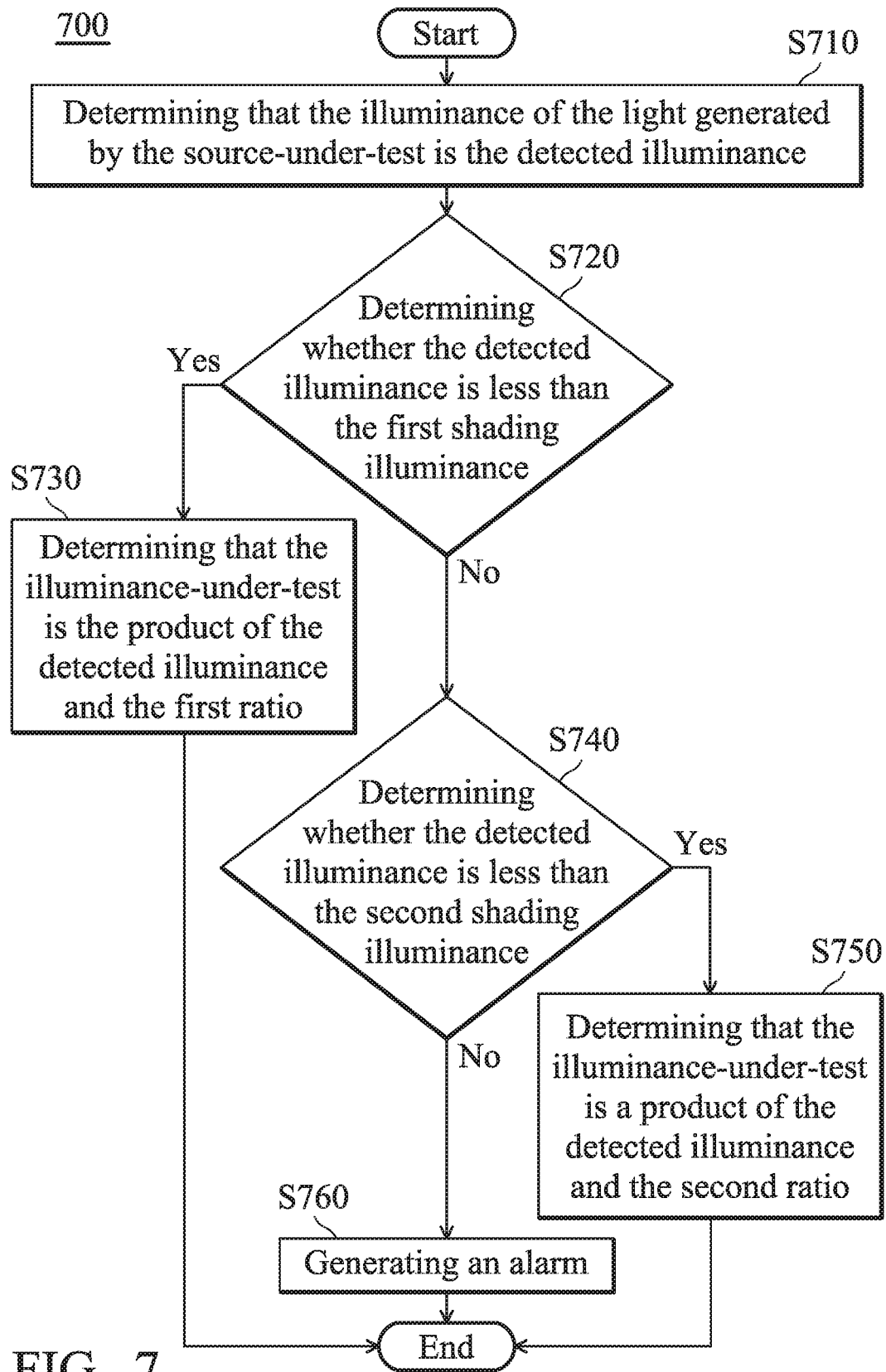
FIG. 7 is a flow chart of an illuminance detecting method in accordance with another embodiment of the invention.

FIG. 7 is a flow chart of an illuminance detecting method in accordance with another embodiment of the invention. The following description to the illuminance detecting method 700 will be described with FIG. 2 for simplicity of explanation.

As shown in FIG. 7, Step S710 to Step S730 are identical to Step S410 to Step S430 in FIG. 4, which are not repeated herein. When the detected illuminance ID is not less than the first shading illuminance ISH1, the controller 213 further determines whether the detected illuminance ID is less than the second shading illuminance ISH2 (Step S740).

When the detected illuminance ID is less than the second illuminance ISH2, the controller 213 determines that the illuminance-under-test IT in FIG. 2 is a product of the detected illuminance ID and the second ratio R2 (Step S750). When the detected illuminance ID is not less than the second shading illuminance ISH2, the controller 213 generates an alarm (Step S760) to inform the user that the detected illuminance IT exceeds the detectable range.

Figure 8:
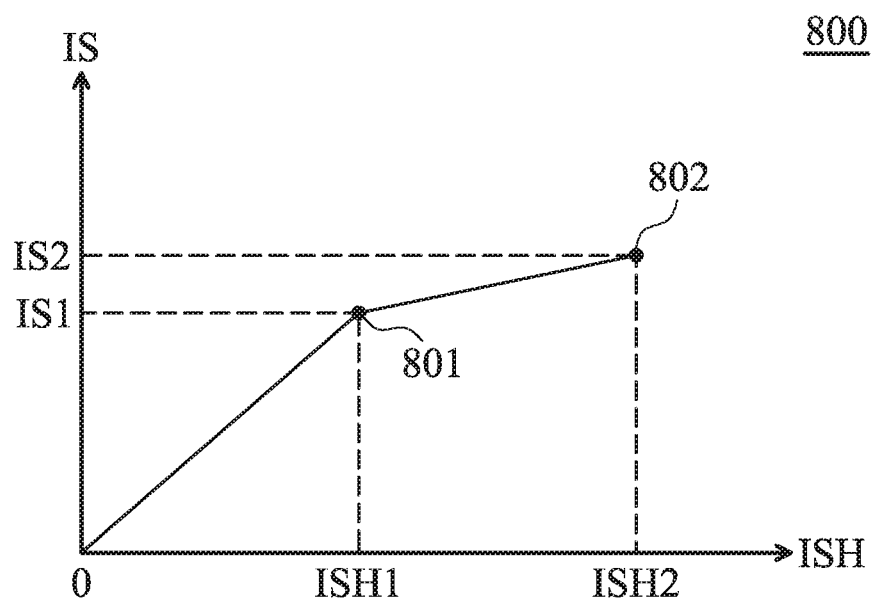
FIG. 8 illustrates the relationship between a source illuminance and a shading illuminance in accordance with another embodiment of the invention.

FIG. 8 illustrates the relationship between a source illuminance and a shading illuminance in accordance with another embodiment of the invention. As shown in FIG. 8, the Y-axis of the graph 800 is the source illuminance IS, and the X-axis is the shading illuminance ISH.

The first data point 801 indicates that the source illuminance IS is the first illuminance IS1, and that the shading illuminance ISH through the shading plate 111 is the first shading illuminance ISH1. The first ratio R1 indicates a slope of a line formed by the first data point 801 and the origin point O. The second data point 802 indicates that the source illuminance IS is the second illuminance IS2, and that the shading illuminance ISH through the shading plate 111 is the second shading illuminance ISH2. The second ratio R2 indicates a slope of a line formed by the second data point 802 and the first data point 801.

According to an embodiment of the invention, when the detected illuminance ID is less than the first shading illuminance ISH1, the controller 213 determines the detected illuminance IT by the first ratio. According to another embodiment of the invention, when the detected illuminance ID is between the first shading illuminance ISH1 and the second shading illuminance ISH2, the controller 213 determines the detected illuminance IT by the second ratio R2.

According to another embodiment of the invention, when the detected illuminance ID exceeds the second illuminance ISH2, the controller 213 may not determine the illuminance-under-test IT. Therefore, the controller 213 generates an alarm to inform the user that the illuminance-under-test IT exceeds the detectable range.

According to other embodiments of the invention, the designer may raise the maximum source illuminance, such that the illuminance detecting device 200 can detect higher illuminance. According to other embodiments of the invention, the controller 113 may generate a plurality of different source illuminance IS between the origin point O and the second illuminance IS2 for improving the accuracy that the illuminance detecting device 200 determines the illuminance-under-test IT such that the illuminance-under-test IT could be determined more accurately.

Illuminance calibrating devices, illuminance calibrating methods, and illuminance detecting methods are provided herein. The designer is capable of effectively improving the consistency of determining illuminance using different devices and raising the accuracy of determining illuminance-under-test IT, according to the teaching provided herein.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An illuminance calibrating device, comprising:
a reference light source, generating light of a specified wavelength and a source illuminance, wherein the reference light source adjusts the source illuminance to be a first illuminance according to a control signal; and
an illuminance detecting device, comprising:
a shading plate, configured to lower the first illuminance to a first shading illuminance;
an illuminance detector, detecting the first shading illuminance to generate a first detection signal; and
a controller, generating the control signal and calculating a first ratio of the first illuminance to the first shading illuminance according to the first detection signal, wherein when the illuminance detecting device is configured to detect illuminance generated by a source-under-test, the illuminance detector determines, through the shading plate, that illuminance with the specified wavelength from the source-under-test is equal to a detected illuminance and generates a second detection signal, and the controller determines that the illuminance generated by the source-under-test is a product of the detected illuminance and the first ratio according to the second detection signal, wherein the detected illuminance is less than the first shading illuminance.

2. The illuminance calibrating device of claim 1, wherein the controller adjusts the source illuminance to be a second illuminance according to the control signal, the shading plate lowers the second illuminance to be a second shading illuminance, the illuminance detector determines the second shading illuminance to generate a third detection signal, and the controller calculates a second ratio of a first difference to a second difference according to the third detection signal.

3. The illuminance calibrating device of claim 2, wherein the first difference is the second illuminance minus the first illuminance, and the second difference is the second shading illuminance minus the first shading illuminance, wherein the second illuminance exceeds the first illuminance and the second shading illuminance exceeds the first shading illuminance.

4. The illuminance calibrating device of claim 2, wherein when the illuminance detector is configured to determine illuminance of the source-under-test, the illuminance detector determines, through the shading plate, that illuminance with the specified wavelength of the source-under-test is equal to the detected illuminance and generates the second detection signal, and the controller further determines whether the detected illuminance exceeds the first shading illuminance and/or the second shading illuminance.

5. The illuminance calibrating device of claim 4, wherein when the detected illuminance exceeds the first shading illuminance and is less than the second shading illuminance, the controller determines that the illuminance of the source-under-test is a product of the detected illuminance and the second ratio.

6. The illuminance calibrating device of claim 1, wherein the specified wavelength is from 390 nm to 700 nm.

7. An illuminance calibrating method, comprising:
generating light of a specified wavelength and a source illuminance by using a reference light source;
adjusting the source illuminance to be a first illuminance;
lowering the first illuminance to be a first shading illuminance by using a shading plate;
determining the first shading illuminance;
calculating a first ratio of the first illuminance to the first shading illuminance;
adjusting the source illuminance to be a second illuminance, wherein the second illuminance exceeds the first illuminance;
lowering the second illuminance to be a second shading illuminance by using the shading plate;
determining the second shading illuminance; and
calculating a second ratio of a first difference to a second difference, wherein the first difference is the second illuminance minus the first illuminance, and the second difference is the second shading illuminance minus the first shading illuminance.

8. The illuminance calibrating method of claim 7, wherein the specified wavelength is from 390 nm to 700 nm.

9. An illuminance detecting method, comprising:
determining that illuminance of a specified wavelength generated by a source-under-test is a detected illuminance by using a shading plate;
determining whether the detected illuminance is less than a first shading illuminance; and
when the detected illuminance is less than the first shading illuminance, determining that the illuminance of the source-under-test is a product of the detected illuminance and a first ratio, wherein the first ratio corresponds to the first shading illuminance;

determining whether the detected illuminance is less than the first shading illuminance and/or a second shading illuminance;

when the detected illuminance is not less than the first shading illuminance and is less than the second shading illuminance, determining that the illuminance of the source-under-test is a product of the detected illuminance and a second ratio, wherein the second shading illuminance exceeds the first shading illuminance, and the second ratio corresponds to the second shading illuminance; and when the detected illuminance is not less than the second shading illuminance, generating an alarm.

10. The illuminance detecting method of claim 9, wherein the specified wavelength is from 390 nm to 700 nm.

* * * * *